United States Patent
Lee et al.

(10) Patent No.: US 8,310,727 B2
(45) Date of Patent: Nov. 13, 2012

(54) METHOD TO GENERATE RANDOM AND DENSITY CONTROLLABLE DOT PATTERNS ON AN OPTICAL DEVICE

(75) Inventors: Cheng-Tai Lee, Tainan Hsien (TW); Jee-Gong Chang, Tainan Hsien (TW); Chi-Chuan Hwang, Tainan Hsien (TW)

(73) Assignee: National Applied Research Laboratories, Taipei (TW)

( * ) Notice: Subject to any disclaimer, the term of this patent is extended or adjusted under 35 U.S.C. 154(b) by 298 days.

(21) Appl. No.: 12/842,430

(22) Filed: Jul. 23, 2010

(65) Prior Publication Data

US 2010/0321455 A1    Dec. 23, 2010

Related U.S. Application Data

(63) Continuation-in-part of application No. 11/583,821, filed on Oct. 20, 2006, now abandoned.

(51) Int. Cl.
   G09G 3/00     (2006.01)
   G02B 6/04     (2006.01)
   G02B 6/00     (2006.01)

(52) U.S. Cl. .......... 358/3.1; 385/120; 385/147; 345/30; 358/1.1

(58) Field of Classification Search ................. 347/110; 345/30, 44; 385/120, 147
   See application file for complete search history.

(56) References Cited

U.S. PATENT DOCUMENTS

| 6,754,419 B2 * | 6/2004 | Ide et al. ................. 385/120 |
| 2007/0176854 A1 * | 8/2007 | Ward et al. ................. 345/44 |

* cited by examiner

Primary Examiner — King Poon
Assistant Examiner — Brett Gardner
(74) Attorney, Agent, or Firm — Rosenberg, Klein & Lee (57) ABSTRACT

A method to generate random and density controllable dot patterns on an optical device includes steps of dividing a 2D domain into multiple cell units; determining dot density in each cell; creating at random initial location of dots in each cell; solving the force operation cut radius of the dot; setting up a residual force; solving the force control parameter in the cell; performing the force operation for the cell; making the dots in the cell to achieve balanced positions after repeated operation; completing the generation of a dot pattern within a 2D domain; and transferring the dot pattern to the optical device by a transfer printing equipment.

8 Claims, 7 Drawing Sheets

METHOD TO GENERATE RANDOM AND DENSITY CONTROLLABLE DOT PATTERNS ON AN OPTICAL DEVICE

This is a Continuation-In-Part application of U.S. patent application Ser. No. 11/583,821, filed on Oct. 20, 2006, currently pending.

BACKGROUND OF THE INVENTION (a) Field of the Invention

The present invention relates to a method to generate random and density controllable dot patterns on an optical device, and more particularly, to a method applied to a microstructure of an optical device, or a method of arranging dots of the microstructure on a light guide plate, and the method employs algorithm of molecular-dynamics theories to execute random movement of dots distributed on a 2D plane so that the density of the dots thereon is controllable and the dot-to-dot relative positions are distributed at random.

(b) Description of the Prior Art

To liquid-crystal display (LCD) backlight modules generally available in the market today, the arrangement of dot-patterns or the optical micro-structural arrangement on light guide when featuring random distribution are more capable of avoiding the presence of unpredictable Moire; and how to provide uniform luminance of the light illuminant surface of the light guide, the control of the density distribution of dots become the key issue in the design. The dispersed pattern technology commonly applied at present is applicable to the light guide in a light emitting liquid crystal display or an astigmatic sheet as taught in U.S. Pat. Nos. 6,754,419 and 6,865,325. However, the algorithm of either patent cited fails to achieve highly uniform irregular distribution within a given area for the distribution of dots, or to draw forth control parameters with a specific type of force-function resulting in further failure to achieve smooth distribution of dots with force control parameter for liquid crystal boards of different dot densities. Therefore, both patents fail to achieve the optimal use by their dispersed pattern technologies as disclosed.

SUMMARY OF THE INVENTION

The primary purpose of the present invention is to provide a method to generate random 2D dot-patterns with density controllable on an optical device, and the method is mainly applied to a microstructure of an optical device, such as arranging a dot pattern of a light guide plate of a backlight module, and the method is executed by a computer, and the method includes the following steps:

A. dividing a 2D domain into multiple cell units;
B. determining dot density in each cell;
C. creating at random initial location of dots in each cell;
D. solving the force operation cut radius of the dot by employing the following equation:

$$r_{cut} = l \sqrt{\frac{\sum_{k}^{m} \bar{r}_k^2}{D \cdot a_c \cdot m}} \; ;$$

E. setting up a residual force;
F. solving the force control parameter in the cell by employing the following equation:

$$s_c = \frac{-\ln f_{re}}{|r_{ij}|} \; ;$$

G. performing the force operation for the cell by employing the following equation:

$$f(r_{ij}) = \begin{cases} \dfrac{r_{ij}}{|r_{ij}|} \cdot e^{-(r_{ij} \cdot s_c)}, & r_{ij} \leq r_{cut} \\ 0, & r_{ij} > r_{cut} \; ; \end{cases}$$

H. making the dots in the cell to achieve balanced positions after repeated operation; and
I. completing generating a dot pattern within a 2D domain. Wherein, the cell is a square; and the setting of residual force is 0.001.
J. transferring the dot pattern to an optical device by a transfer printing equipment.

Preferably the present invention is a light guide designed by employing the method to generate random 2D dot-patterns with density controllable on an optical device as described above.

Preferably the present invention is a backlight module for the light guide designed by employing the method to generate random 2D dot-patterns with density controllable on an optical device as described above.

Preferably the present invention is a liquid crystal display designed by employing the method to generate random 2D dot-patterns with density controllable on an optical device as described above.

Preferably the present invention is a dot-pattern designed by employing the method to generate random 2D dot-patterns with density controllable on an optical device as described above.

Preferably the present invention is a computer readable storage medium containing the programs of the method to generate random 2D dot patterns with density controllable on an optical device as described above.

Preferably the present invention is a system of the method to generate random 2D dot-patterns with density controllable on an optical device as described above.

The prevent invention provides the following advantages:

1. The present invention introduces the concept of is variable cut radius, which in molecular dynamics is a method to save the operation amount of a computer. In the present invention, the variable cut radius is deemed as a method of motion space with a specific dot for the distribution of dots within a given domain to attain irregular distribution that is highly uniform.

2. The present invention draws forth force control parameter by specific type of force function and employs repulsive force model of an exponential function to lead to a force control parameter for the control of the force distribution curve so that the cut radius of each dot in each cell becomes variable by changing the dot-to-dot operation relation through modulation of the parameter.

3. The present invention realizes smooth distribution of dots with the force control parameter. In processing the operation of the dots distribution of any two abutted cells containing different numbers of dot, force control parameters each of the abutted cells located on the boundary of the cell are taken into consideration to attain the optimal distribution locations for the dots distribution to achieve smooth changes.

4. The present invention is capable of providing highly uniform distribution, i.e., higher capability for the irregular uniform distribution, and is free of prescribing the upper limit of the number of dots within the pre-designated statistical region.

5. The present invention yields high filling rate. The filling rate is solved by having the product of the real coverage of the circular dots within a given domain multiplied by the total number of dots contained in the domain to be divided by the area of the domain. Should the number of dots designed for a single cell is not greater than 1000, a filling rate not less than 60% is attainable for all the dots without overlapping from one another. Should this efficacy be converted using the method to solve filling rate as disclosed in the prior art (i.e., Taiwan Patent No. I224698), the filling rate of dots distribution of the present invention is as high as 76%.

DETAILED DESCRIPTION OF THE PREFERRED EMBODIMENTS

Figure 1:
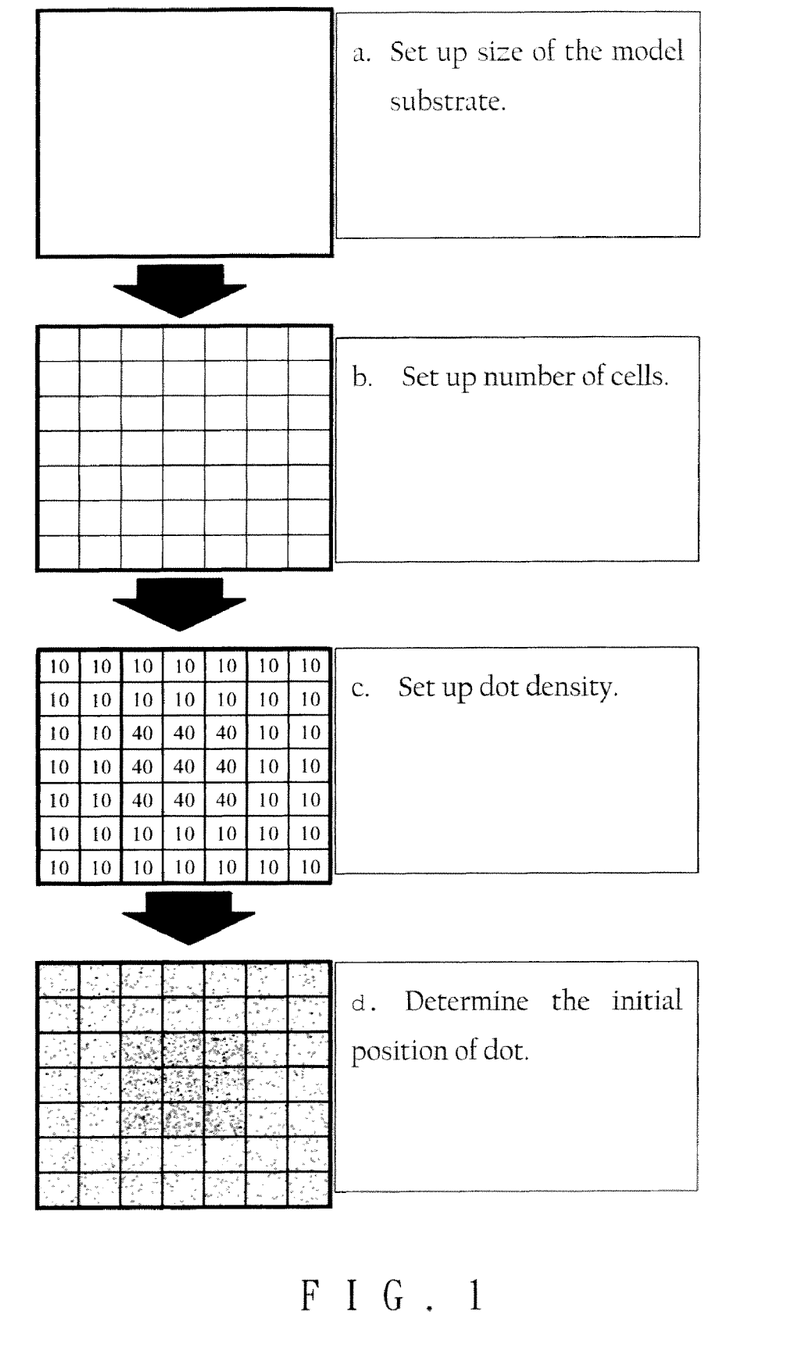
FIG. 1 is a flow chart showing the creation of a system model in a preferred embodiment of the present invention.

Referring to FIG. 1, a system model of the present invention is created in the following process:

a. Set up the dimension of the substrate for the model.

b. Set up the number of cells: in doing so, the entire dots distribution 2D is divided into a plane by the arrangement of multiple square cells.

c. Set up dot density (%) before deciding on the dot filling density (D) in each cell. The filling density (D) is solved by employing Equation (1) as follows:

$$D = \frac{A_{dot}}{A_{cell}} = \frac{\sum_{k}^{m} \pi \cdot \bar{r}_k^2}{A_{cell}} \quad (1)$$

where, m represents the total number of dots within a cell; and $\bar{r}_k$ represents the radius of each dot.

d. Determine the initial position of dot: when the density for each cell is determined, the number of dots in that cell is also determined; and the initial position of dot in each cell is then determined by fuzzy at random.

In the force operation relation adopted according to the algorithm proposed by the present invention, the perimeter of the substrate must be set up as a periodical boundary to achieve balanced conditions since there is only the repulsive force relation existing among dots.

In the present invention, motion of an atom is considered as that of a dot as illustrated in Equation (2) below according to the methodology of molecular dynamics while observing the Newton's Second Law of Motion:

$$m\frac{d^2 r_i}{dt^2} + c\frac{dr_i}{dt} = \sum_{j}^{n} f_{ij}(r_i, r_j) \quad (2)$$

where, $r_i$ is the position of $i^{th}$ dot; m is the mass of the dot; c is the damping term of the motion system; and $f_{ij}$ is the force between Dot i and its adjacent Dot j. In the concept of molecular dynamics, a certain energy relation existing among atoms known as the potential energy $\phi_{ij}(r_{ij})$, and the potential energy is a function of the relative distance among atoms. Therefore, force among atoms may be solved by differential of the distance as illustrated in Equation (3) below:

$$\frac{d\phi_{ij}}{dr} = f_{ij}(r_i, r_j) \quad (3)$$

By incorporating both Equations (2) and (3), it is found that a motion status of a dot is a result of a force applied to it from its adjacent dots. When the total force applied to that dot is at its minimum, it is safe to say that that dot has attained its balanced position in the system and starts to execute mild regular oscillation.

Perform integration for Equation (2) with a range of micro time lag $\Delta t = t - t_0$, to solve the position of a dot after a micro time lag as illustrated in Equation (4) below:

$$r_i(t) = r_i(t_0) + \frac{1}{c}\int_0^t d\tau F_i(\tau)\left\{1 - \exp\left[-\frac{c(t-\tau)}{m}\right]\right\} \quad (4)$$

where, $F_i$ is the total force that Dot i is subject to, i.e., $F_i = \sum_{j=1}^{n} f_{ij}$ Whereas the present invention focuses on the randomized position of the dot distribution on 2D plane, the mass relation in the real physical system can be ignored. Therefore, Equation (4) is simplified with the assumption of $\frac{c}{m} \to \infty$ into a Differential Equation (5) as follows:

$$r_i(t + \Delta t) = r_i(t) + \frac{1}{c}\Delta t F_i(t) \quad (5)$$

Equation (5) is related to one that predicts the position. That is, the position for each dot at the next step of time is the corrected position of the current step of time solved. However, the damper coefficient, C, is also a determinant factor other than the amount of the total force externally applied to the dot that affects the correction of the dot at each unit step of time.

Step of time $\Delta t$ in the computer operation plays a role of each operation loop. Once the value of C gets greater, $\Delta t/c$ can be seen as such that the correction in each operation loop tends to get smaller; on the contrary, the smaller the value of C is, the greater correction gets.

The force operation equation applied for the term of exponent in the present invention is Equation (6)

$$f(r_{ij}) = \begin{cases} \frac{r_{ij}}{|r_{ij}|} \cdot e^{-(r_{ij} \cdot s_c)}, & r_{ij} \le r_{cut} \\ 0, & r_{ij} > r_{cut} \end{cases} \quad (6)$$

where, $r_{ij}$ is a vector representing relative distance among dots; $S_c$ is a force control parameter for each dot; and $r_{cut}$ is a force operation cut radius of dot.

A parameter $A_r$ is defined to represent the reaction area of each dot and extendable to its adjacent cell before explaining how to determine the force operation cut radius of the dot. In the present invention, conditions are set up with the minimal reaction area for analysis as shown in Equation (7):

$$A_{r\_min} = \frac{A_{cell}}{a_c \cdot m} \quad (7)$$

where, $a_c$ is the ratio parameter and is set at 1; and m represents the number of dots within a cell.

Figure 2:
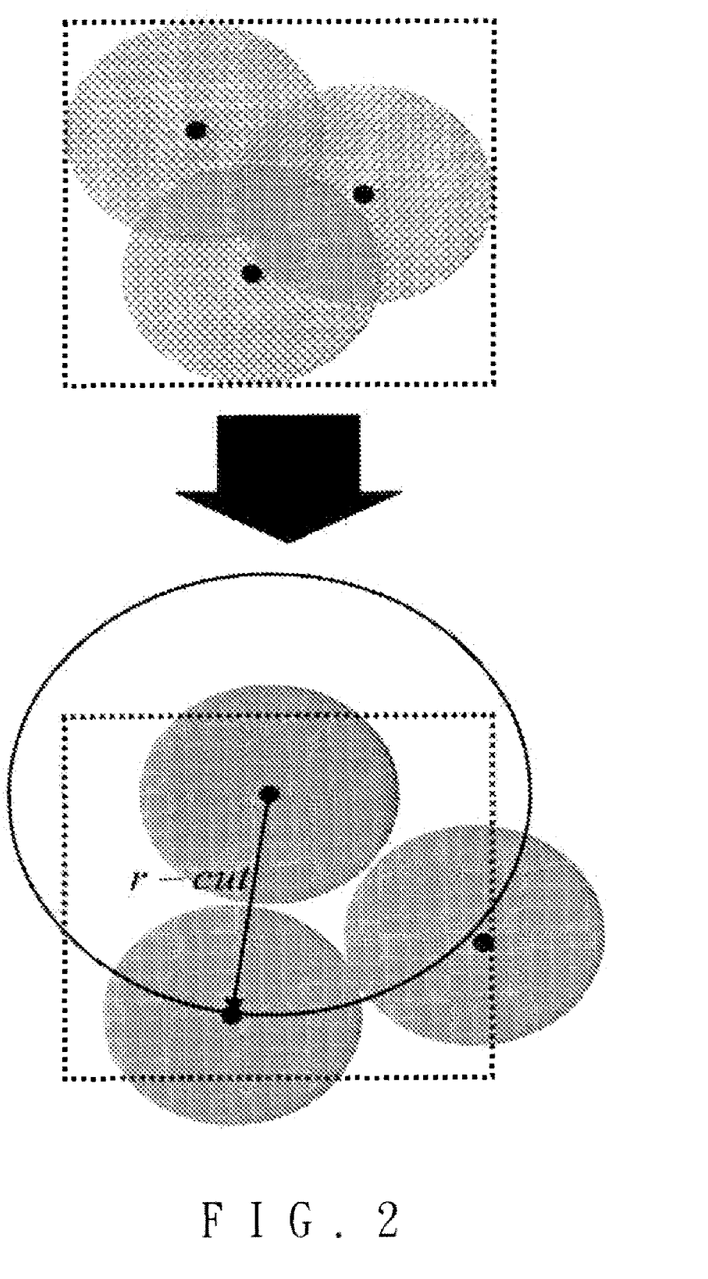
FIG. 2 is a schematic view showing the reaction area of dots in the preferred embodiment of the present invention.

As illustrated in FIG. 2, if a cell contains three dots and the total area of the dots is equal to that of the cell, partial overlapped area of the dots must take place. To avoid overlapping, the minimal distance among dots has to be two times over the radius of any current dot. Accordingly, the distance relation is set as $r_{cut}$ of the dot within the cell that can be solved by Equation (8) as follows:

$$r_{cut} = l \sqrt{\frac{\sum_{k}^{m} \vec{r}_k^2}{D \cdot a_c \cdot m}} \quad (8)$$

where l is the ratio factor.

Figure 3:
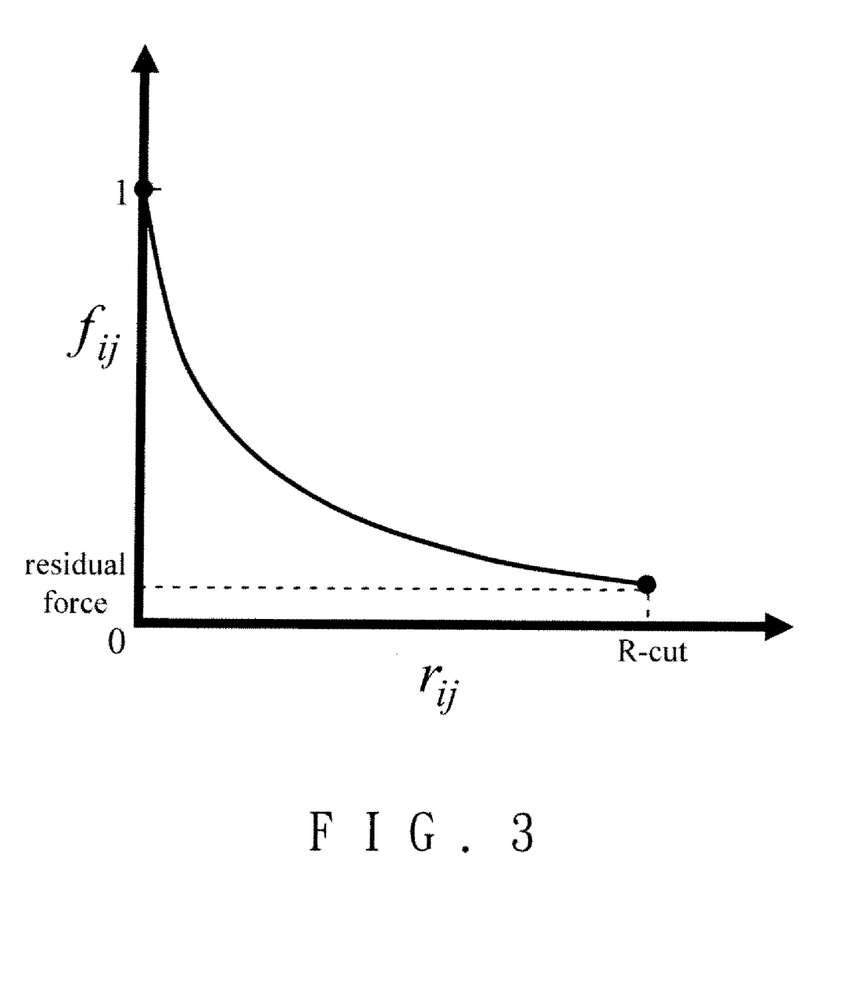
FIG. 3 is a schematic view showing a force function in the preferred embodiment of the present invention.

The primary reason to select the force operation equation of the exponent term is for its simple form of function to easily solve the force control parameter. The residual force, $f_{re}$ must be determined before solving the force control parameter. The value selected for the residual force is directly reacted in the size of the resultant force each dot is subject to in each operation step. Although assignment of a greater value to $f_{re}$ pays the greater correction of the position in each operation step so that the balanced position can be attained for the dot in shorter time, the entire operation time increases instead since the greater value of position correction means frequent access to and from the cell boundary to warrant continuous performance of Verlet algorithm. 0.001 is proposed for $f_{re}$ in the present invention that provides more efficiency in the course of operation. The pattern plotted in FIG. 3 is related to one of dot-to-dot force operation function; wherein, the amount of force reaction at the position of the length $r_{cut}$ is the very residual force.

When both the residual force and the cut radius are finalized, the force control parameter is determined for each cell by employing Equation (9). The primary purpose of the force control parameter is to is serve as a modulation technique in the process of the force operation of the dot in the adjacent cell.

$$s_c = \frac{-\ln f_{re}}{|r_{ij}|} \quad (9)$$

where $|r_{ij}|=r_{cut}$. All parameters required in the entire process have been determined and the algorithm is described as follows.

Figure 4:
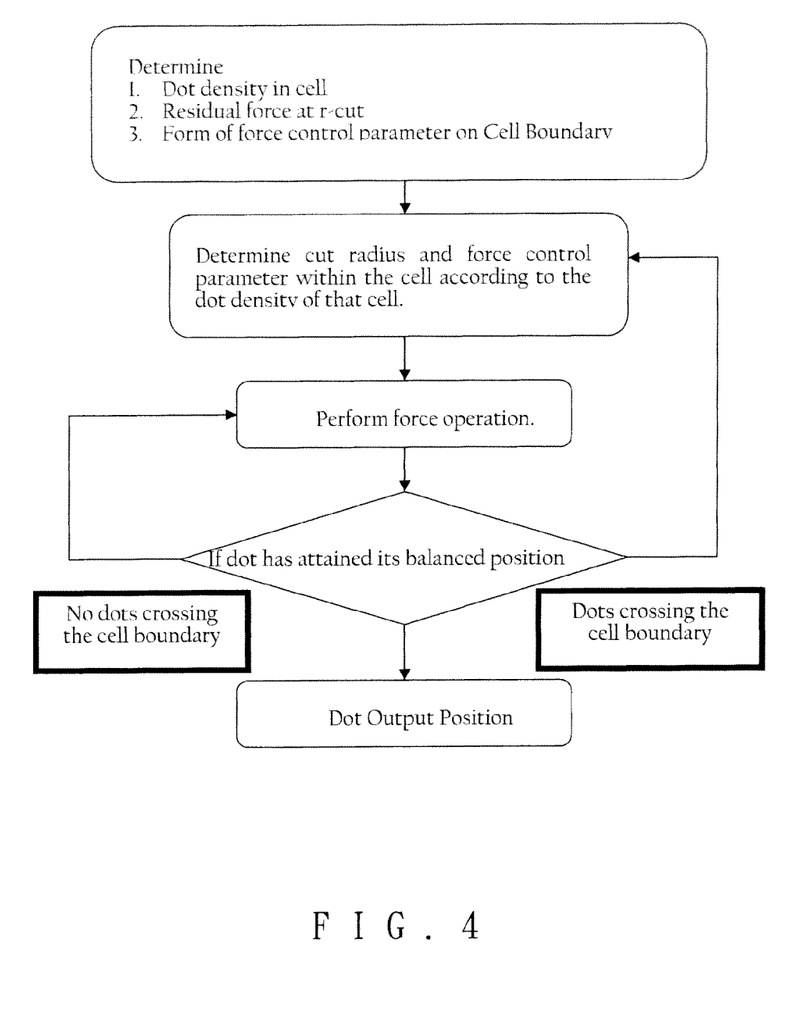
FIG. 4 is a flow chart showing an algorithm in the preferred embodiment of the present invention.

Whereas the present invention focuses on how to generate dot-pattern that is random, consistently distributed with its density controllable on an optical device; the distribution position of dot is the ultimate results desired. FIG. 4 illustrates the operation process that commencing from solving parameters needed for the operation process by taking advantage of the mathematic structure as described above before proceeding to force operation process until the dot-pattern is availed as desired to end up the operation of the loop at the position of the output dot.

Figure 5:
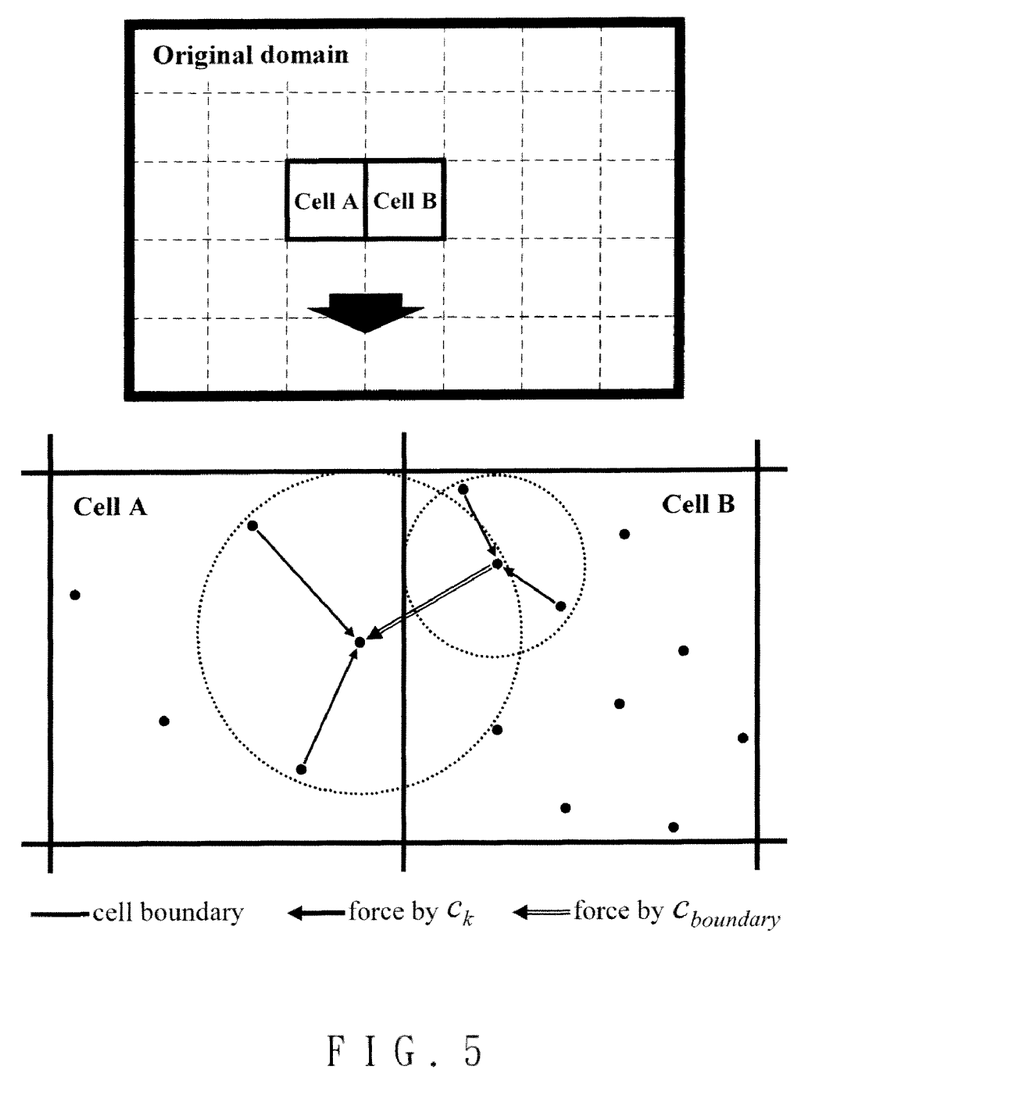
FIG. 5 is a schematic view showing force reaction of dots on the boundary in the preferred embodiment of the present invention.

When the dot density in the adjacent cell varies, the cut radius and force control parameters applicable to that cell also differ. Judging from Equations (8) and (9), it is found that when $r_{cut}$ varies, the resultant force control parameter also differs. Proper command of the force control parameter will create a transition region featuring a smooth density distribution on the boundary of the adjacent cell of different dot density. FIG. 5 illustrates the process of the force operation for the dot crossing the cell boundary.

As illustrated in FIG. 5, the dot $r_{cut}$ of Cell A with lower dot density is greater than that of Cell B; therefore, the dot in the $r_{cut}$ (broken line) of Dot A1 will exert repulsive force against A1. A1 appears to be subject to two different types of repulsive force and the force control parameter introduced determines the primary variation between the two types of repulsive force. The force applied from the dot in the same cell on A1 (dark line with arrow) is solved by substituting with force control parameter $S_c$ of Cell A in Equation (6). Dot B1 in Cell B will apply a certain force, but the force is not determined by substitution with Cell B force control parameter; instead, Equation (10) is employed to determine the force operation parameter when the dot crosses the boundary:

$$s_{c\_b} = \frac{S_{c\_cellA} + S_{c\_cellB}}{2} \quad (10)$$

Equation (10) forthwith takes the arithmetic mean of force control parameters of two abutted Cells becomes the parameter to be introduced into Equation (6) for solving the force taking place on the cell boundary (dotted line with arrow).

Since the dot density of Cell B is higher, the $r_{cut}$ of Dot B1 becomes smaller. Therefore, Dot B1 is subject only to the force applied by the other two dots within the same cell without being affected by A1. That is, the action between A1 and B1 is one-way nature, not such as described for the force among atoms in the orthodontic molecular is dynamics that force between two atoms takes place by opposite corners.

Figure 6:
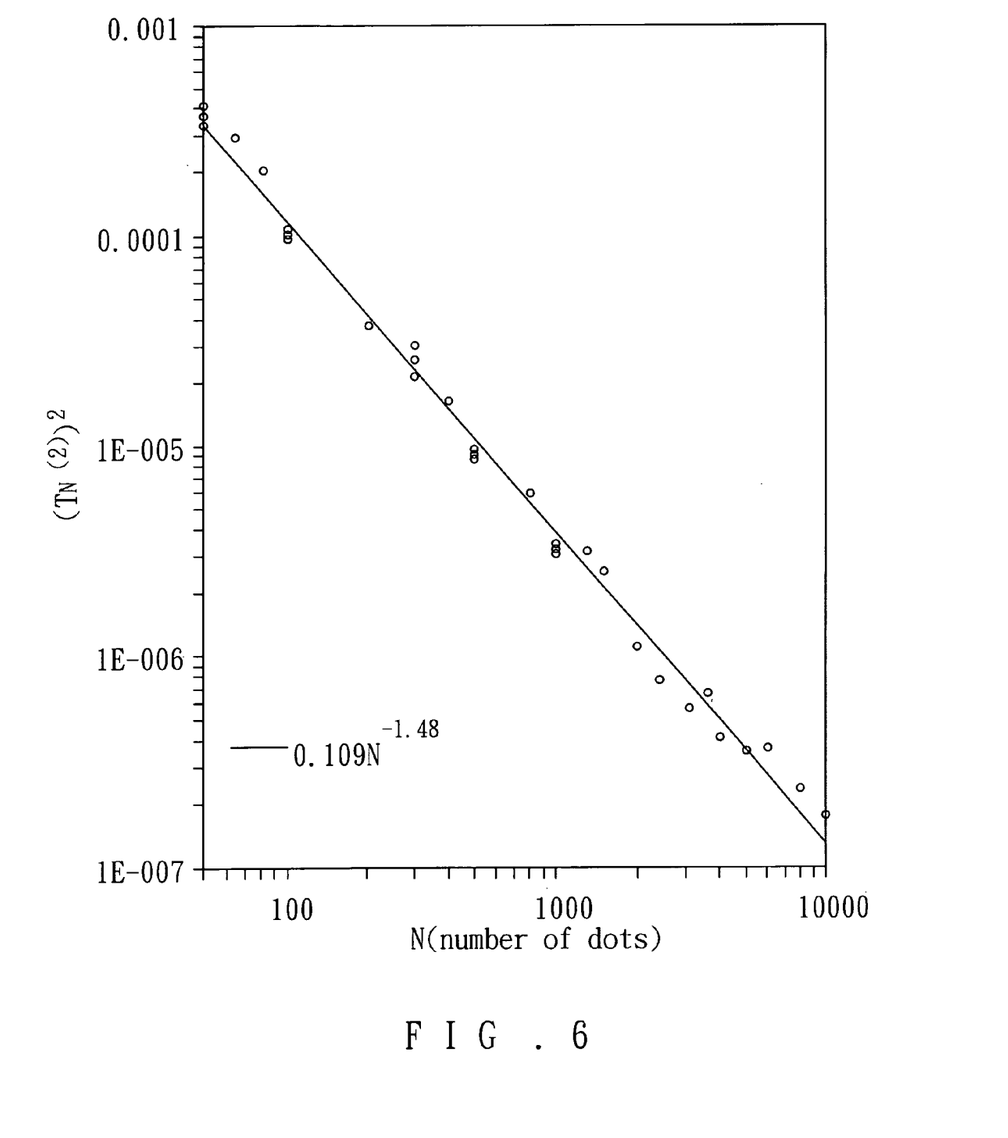
FIG. 6 is a schematic view showing the uniform distribution statistics of dots distribution at random in the preferred embodiment of the present invention.

FIG. 6 shows the results of uniform distribution of random distribution of dots in different numbers within a 3*3 pre-designated cell region under different number of dots according to the statistics compiled by employing Equation (2). Within a pre-designated region, the value of uniform distribution of random distribution varies depending on the number of dots contained in that region though it must satisfy Equation (1).

Figure 7:
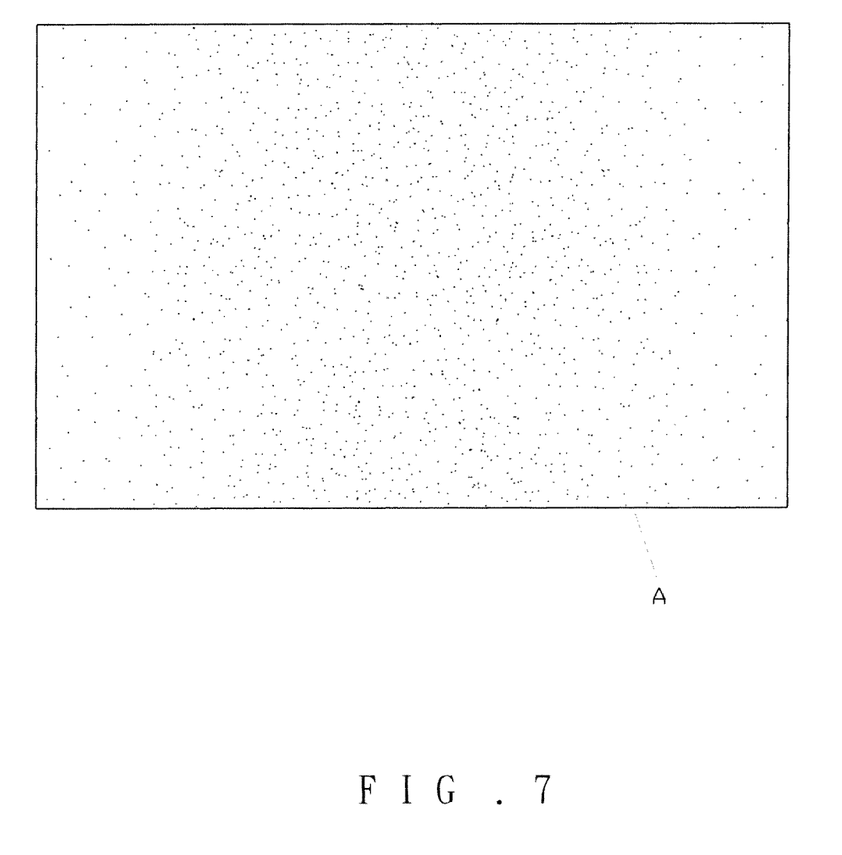
FIG. 7 is a schematic view showing a dot pattern transferred onto a light guide plate in the preferred embodiment of the present invention.

After the dot pattern is completed, the dot pattern is transferred to an optical device by a transfer printing equipment to form a microstructure arrangement of the optical device. The method is specially applicable for arranging the dot pattern on a light guide plate (A) as shown in FIG. 7, such that the feature of the random distribution can prevent the unpredictable occurrence of Moires, such that a uniform brightness at a light emitting surface can be achieved by controlling the density distribution of the dots.

What is claimed is:

1. A method to generate random and density controllable dot patterns on an optical device, and the method being executed by a computer, and including the following steps:
   A. dividing a 2D domain into multiple cell units;
   B. determining dot density in each cell;
   C. creating at random initial location of dots in each cell;
   D. solving the force operation cut radius of the dot by employing the following equation;

$$r_{cut} = l\sqrt{\frac{\sum_{k}^{m} \bar{r}_k^2}{D \cdot a_c \cdot m}}$$

E. setting up a residual force;
   F. solving the force control parameter in the cell by employing the following equation;

$$s_c = \frac{-\ln f_{re}}{|r_{ij}|}$$

G. performing the force operation for the cell by employing the following equation;

$$f(r_{ij}) = \begin{cases} \frac{r_{ij}}{|r_{ij}|} \cdot e^{-(r_{ij} \cdot s_c)}, & r_{ij} \leq r_{cut} \\ 0, & r_{ij} > r_{cut} \end{cases}$$

H. making the dots in the cell to achieve balanced positions after repeated operation;
   I. completing generating a dot pattern within a 2D domain; and
   J. transferring the dot pattern to the optical device by a transfer printing equipment;

wherein, $r_{ij}$ is a vector representing relative distance among dots; $S_c$ is the force control parameter for each dot; $r_{cut}$ is the force operation cut radius of the dot; l is ratio factor; m is total number of dots in a cell; $\bar{r}_k$ is the radius of each dot; $f_{re}$ is residual force; and $a_c$ is ratio parameter.

2. The method to generate random and density controllable dot patterns on an optical device as claimed in claim 1, wherein each cell is a square.

3. The method to generate random and density controllable dot patterns on an optical device as claimed in claim 1, wherein the setting of the residual force is 0.001.

4. The method to generate random and density controllable dot patterns on an optical device as claimed in claim 1 employed in a light guide designed therefor.

5. The method to generate random and density controllable dot patterns on an optical device as claimed in claim 1 employed in a backlight module of a light guide designed therefor.

6. The method to generate random and density controllable dot patterns on an optical device as claimed in claim 1 employed in a liquid crystal display designed therefor.

7. A dot pattern that is designed by employing the method to generate random and density controllable dot patterns on an optical device as claimed in claim 1.

8. A non-transitory computer readable storage medium containing the method to generate random and density controllable dot patterns on an optical device as claimed in claim 1.

\* \* \* \* \*